United States Patent
Yasui

Patent Number: 5,701,538
Date of Patent: Dec. 23, 1997

[54] PHOTOGRAPHIC FILM CASSETTE AND PRODUCTION METHOD THEREFOR

[75] Inventor: Mototada Yasui, Kanagawa, Japan

[73] Assignee: Fuji Photo Film Co., Ltd., Kanagawa, Japan

[21] Appl. No.: 615,833

[22] Filed: Mar. 14, 1996

[30] Foreign Application Priority Data

Mar. 16, 1995 [JP] Japan ................................ 7-757483

[51] Int. Cl.[6] .................................................. G03B 17/26
[52] U.S. Cl. .................................................. 396/512
[58] Field of Search ................ 354/275; 396/512, 396/514, 515, 516

[56] References Cited

U.S. PATENT DOCUMENTS

| | | | |
|---|---|---|---|
| 5,032,854 | 7/1991 | Smart et al. | 354/21 |
| 5,280,327 | 1/1994 | Stoneham et al. | 354/275 |
| 5,296,887 | 3/1994 | Zander | 354/275 |
| 5,347,334 | 9/1994 | Smart et al. | 354/275 |

FOREIGN PATENT DOCUMENTS 6-82984  3/1994  Japan ........................ G03C 3/00

Primary Examiner—Safet Metjahic
Assistant Examiner—John Chizmar
Attorney, Agent, or Firm—Sughrue, Mion, Zinn, Macpeak & Seas, PLLC

[57] ABSTRACT

A photographic film cassette has a spool with a roll of filmstrip wound thereon, a disc secured to or formed integrally with the spool, and a bar code disposed on an outer surface of the disc. The bar code is constituted of a pattern of alternating low level segments and high level segments arranged in correspondence with a bit pattern of binary data. According to the invention, the low level segments are formed by the outer surface of the disc, and the high level segments are formed by hot stamping a high reflective material onto the outer surface of the disc. The outer surface of the disc has a surface roughness of 0.1 μm to 20 μm.

19 Claims, 8 Drawing Sheets

FIG. 10

| | COMPARATIVE EXAMPLE 1 | EMBODIMENT 1 | EMBODIMENT 2 | EMBODIMENT 3 | EMBODIMENT 4 | EMBODIMENT 5 | EMBODIMENT 6 | COMPARATIVE EXAMPLE 2 |
|---|---|---|---|---|---|---|---|---|
| CUTTING EDGE ANGLE (θ) | 58 | 60 | 65 | 70 | 80 | 85 | 90 | 92 |
| RELIABILITY IN BAR CODE READING | D | C | B | A | A | B | C | D |

FIG. 11

| | COMPARATIVE EXAMPLE 3 | EMBODIMENT 7 | EMBODIMENT 8 | EMBODIMENT 9 | EMBODIMENT 10 | EMBODIMENT 11 | EMBODIMENT 12 | EMBODIMENT 13 | COMPARATIVE EXAMPLE 4 |
|---|---|---|---|---|---|---|---|---|---|
| SURFACE ROUGHNESS Rmax ($\mu$m) | 0.08 | 0.10 | 0.20 | 0.30 | 1.0 | 10.0 | 15.0 | 20.0 | 22.0 |
| REFLECTANCE OF DATA DISC (8 % OR LESS) | D | C | C | B | A | A | A | A | A |
| REFLECTANCE OF HIGH LEVEL SEGMENT (64 % OR MORE) | A | A | A | A | A | B | B | C | D |
| ADHESIVE STRENGTH OF HIGH LEVEL SEGMENT | B | B | B | B | B | B | C | C | D |

PHOTOGRAPHIC FILM CASSETTE AND PRODUCTION METHOD THEREFOR

BACKGROUND OF THE INVENTION

1. Field of the Invention

The present invention relates to a photographic film cassette. More particularly, the present invention relates to a photographic film cassette whose spool has a bar code representative of information about the filmstrip wound thereon.

2. Background Art

Recently, a leader-advancing photographic film cassette is being developed, which has a cassette shell assembled from plastic parts, and which is able to advance its filmstrip to the outside of the cassette shell in response to unwinding rotation of the spool, as disclosed, for example, in U.S. Pat. Nos. 5,296,887 and 5,032,854, and JPA 6-82984.

It is known in the leader-advancing film cassette that the spool has an integrally rotatable disc with a radial bar code for indicating film information such as the film speed and the number of available image frames.

As is well-known, a bar code is a binary code whose bit pattern is represented by a pattern of alternating bars and spaces, or two kinds of alternating segments: one represents binary "1" (hereinafter referred to as high level segments), and the other represents binary "0" (hereinafter referred to as low level segments).

Conventionally, a bar code is provided by printing or painting the pattern of segments. And it is possible to manufacture a bar code disc of a plastic spool by applying a label with a bar code printed thereon to an outer surface of the plastic disc.

Also, U.S. Pat. No. 5,296,887 discloses a bar code disc having radial cut-outs as the equivalent of the dark regions or black bars of a typical bar code. As disclosed in JPA 6-82984, there is also a bar code disc wherein a bar code is constituted of mirror surface segments and rough surface segments.

PROBLEMS TO BE SOLVED BY THE INVENTION

Because the bar code can be hard for human eyes to discriminate, different kinds of bar code labels or the spools with data discs having different bar codes are likely to be confused with one another, or the bar codes can be mismatched with the filmstrips. Therefore, preventive measures should be taken in handling the bar code labels or the spools or the data discs. This is time-consuming and expensive. Moreover, a label sticking machine therefor can be complicated and inefficient because it is necessary to peel off the bar code label from a base tape and position it exactly on the disc.

In the case of the bar code disc having the cut-outs, if the cut-outs are formed by punching the disc, plastic waste must be appropriately processed for disposal or recycle. To form the cut-outs integrally with the disc by molding would require a large variety of molds in correspondence with the bar code patterns or variations. Also in these methods, preventive measures against confusion should be taken.

This problem goes for the bar code disc having rough surface segments and mirror surface segments, especially when the disc is formed integrally with the spool core. Furthermore, sandblasting for forming the rough surface segments is time-consuming and also requires a large scale machine.

OBJECT OF THE INVENTION

In view of the foregoing, a prime object of the present invention is to provide a film cassette, and a production method thereof, which make it easy to produce a bar code on a disc of a spool, and which make it unnecessary to take complicated preventive measures against the confusion of different bar codes.

Another object of the present invention is to provide a film cassette with a bar code whose high level segments and low level segments can be each other so that a bar code reader or scanner can read the bar code with accuracy, and a production method therefor.

SUMMARY OF THE INVENTION

According to the present invention, a photographic film cassette having a spool with a roll of filmstrip wound thereon, a disc secured to or formed integrally with the spool and a bar code disposed on an outer surface of the disc, the bar code being constituted of a pattern of alternating low level segments and high level segments arranged in correspondence with a bit pattern of binary data, is characterized in that the low level segments are formed by the outer surface of the disc, and the high level segments are formed by a high reflective material transferred onto the outer surface of the disc.

According to a preferred embodiment, the outer surface of the disc has a surface roughness of 0.1 µm to 20 µm. In this range, the low level segments have a sufficient low reflectance. On the other hand, the reflectance of the high reflective material, which is inevitably affected by the surface roughness of the outer surface after the transfer, is not reduced to the extent that the high level segments fail to keep a sufficient high reflectance relative to that of the low level segments, that is, the high level segments have five or more times the reflectance of the low level segments. Therefore, the present invention makes it possible for the bar code reader such as a reflective photosensor, to read or decode the bar code with accuracy. Moreover, setting the surface roughness of the disc 20 µm or less prevents the high level segments from peeling off the disc even under hot and high-humidity circumstances. This is an important feature because the plastic resin material of the spool is mostly loaded with lubricant such as silicone in order to reduce frictional resistance against rotation, and thus the lubricant can separate out to the surfaces of the disc, lowering the adhesive strength of the transferred high reflective material.

In accordance with the object of the invention, a method of producing a photographic film cassette having a spool with a roll of filmstrip wound thereon, a disc secured to or formed integrally with the spool and a bar code disposed on an outer surface of the disc, comprise steps of forming the data disc to have a surface roughness of 0.1 µm to 20 µm, a flatness of 200 µm or less, and transfer-printing high level segments of the bar code onto the outer surface of the disc.

According to a preferred embodiment of the invention, a transfer foil, e.g. a hot stamping foil, having a layer of high reflective material is used in the transfer printing step, and a transfer die having a face pattern corresponding to the high level segments of the bar code is used for transferring the high reflective material from the transfer foil onto the outer surface of the disc to form the high level segments.

Since the flatness of the disc is 200 µm or less, the high level segments can be reliably transferred to the disc by hot stamping with a sufficient adhesive strength of the transferred material.

Also, a large variety of bar code patterns may be provided on the disc only by exchanging the transfer die, without the need for exchanging the transfer foil or the spool.

The transfer die is preferably a relief-engraved hot stamping die having the face pattern as protrusions, and edges of the protrusions preferably have an angle of 60° to 90° so that the high level segments may have sharp-cut edges. Since the flatness of the disc is not more than 200 µm, the high level segments will have sufficiently sharp edges. If the edges of the high level segments are not sufficiently sharp, irregular reflection at the edges would increase the reflectance of the low level segments, so that discrimination between the low and high level segments could not be distinct.

The transfer printing step may preferably be performed immediately before the filmstrip is wound on the spool or before the spool is assembled. In this way, it is unnecessary to store and supply the previously produced bar code discs or spools with the bar code discs to the film cassette assembling line, and so it is unnecessary to take preventive measures against the confusion between different kinds of bar code discs.

BRIEF DESCRIPTION OF THE DRAWINGS

The present invention will become apparent in the following detailed description of the preferred embodiments when read in connection with the accompanying drawings, wherein like reference numerals designate like or corresponding parts throughout the several views, and wherein:

FIG. 10 is a table showing results of an experiment on reliability in bar code reading with respect to bar codes formed by use of hot stamping dies with various cutting edges;

FIG. 11 is a table showing results of an experiment on reflectance and adhesive strength of hot-stamped high level segments in relation to various surface roughness of the data disc.

DETAILED DESCRIPTION OF THE PREFERRED EMBODIMENTS

Figure 1:
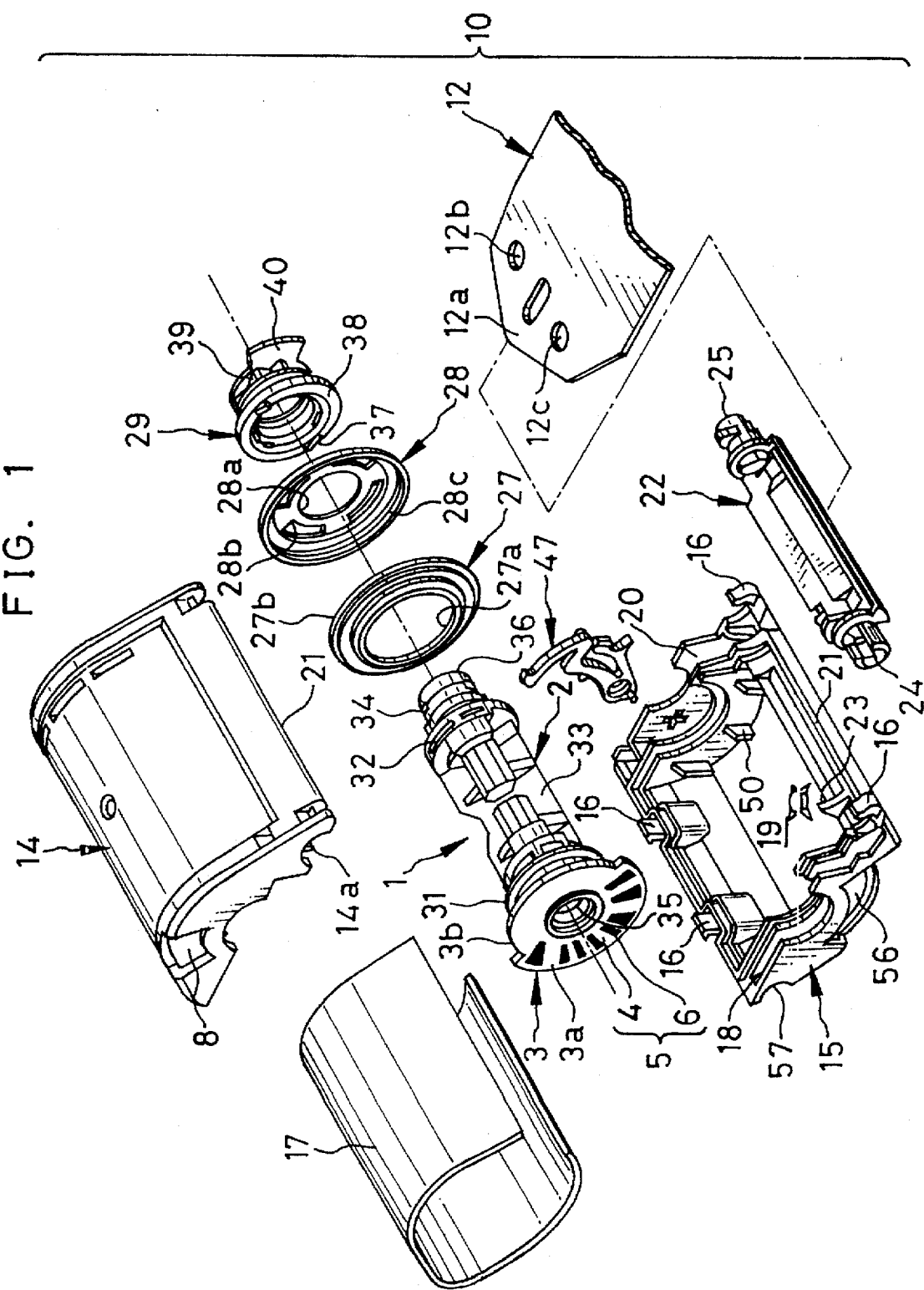
FIG. 1 is an exploded perspective view of a film cassette according to a preferred embodiment of the invention.

FIG. 1 illustrates an example of photographic film cassette 10 having a spool 1 provided with bar code according to the invention. The spool 1 is constituted of a spool core 2 and a data disc 3 formed integrally with the spool core 2, and other members fitted on the spool core 2, as will be described later. The data disc 3 has a large radius portion 3a and a small radius portion 3b, and a bar code 5 is provided in the large radius portion 3a by transfer printing, e.g. hot-stamping, a pattern of high reflective material 6 directly on a low reflective outer surface 4 of the data disc 3, as will be described in detail later. The spool 1 is rotatably contained in the cassette shell 11, and a photographic filmstrip 12 is wound about the spool core 2.

Figure 2:
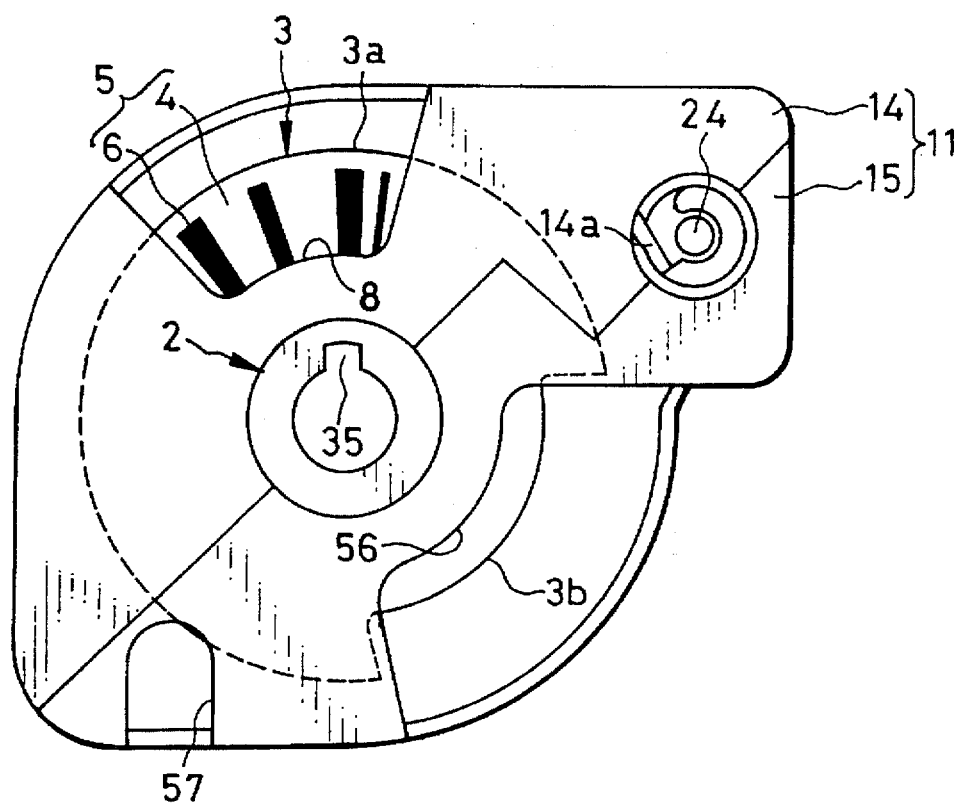
FIG. 2 is a left side view of the film cassette of FIG. 1.

The bar code 5 is a binary code representative of various information about the photographic filmstrip 12 such as the film speed, and the number of available image frames. As shown in FIG. 2, the bar code 5 is exposed to the outside through a data window 8 formed through an end face portion of the cassette shell 11, so that a bar code sensor of a camera can read the bar code 5 while the spool 1 is rotated in the film advancing direction. The bar code data is used for calculating an exposure value, for setting the number of available exposure frames in a frame number counter of the camera, and so forth.

The cassette shell 11 is constituted of a pair of shell halves 14 and 15, each being a molded part formed from resin. The shell halves 14 and 15, hereinafter referred to as upper and lower shell halves respectively, are mated together through engaging members 16. And a shell label 17 is adhered to a peripheral surface of the cassette shell 11.

The inside of the cassette shell 11 is divided into a data disc chamber 18, a film roll chamber 19 and an indicator chamber 20. A passage slot 21 for the photo filmstrip 12 is formed along a front juncture between the shell halves 14 and 15. Behind the passage slot 21 is disposed a light-shielding door 22 which is closed to prevent ambient light from entering the cassette interior through the passage slot 21. A separation claw 23 is disposed behind the door 22 to separate a leader of the photo filmstrip 12 from the roll and guide it toward the passage slot 21. The door 22 has key grooves 24 and 25 on both ends thereof for allowing the door 22 to be rotated by corresponding drive shafts of a camera between the closed position and an open position for enabling the filmstrip 12 to pass through the slot 21. The door 22 is locked by a lock pole 14a formed on the upper shell half 14, as shown in FIG. 2.

A pair of flanges 27 and 28 are mounted on the spool core 2 at an axial spacing given according to the width of the filmstrip 12. A barrel member 29 is mounted on opposite end from the data disc 3. Supporting portions 31 and 32 for supporting the flange 27 and the flange 28 are integrally formed with the spool core 2. A supporting portion 34 for the barrel member 29 is formed outside the engaging portion 32. The supporting portion 31 has a greater diameter about the spool core 2 than the supporting portion 32. Similarly, the flange 27 has a greater bearing hole 27a compared with a bearing hole 28a of the flange 28. Thus, the flange 27 may pass over the supporting portion 32 to mount on the supporting portion 31. Thereafter, the flange 28 and the barrel member 29 may be mounted to the respective supporting portions 32 and 34. Because the flanges 27 and 28 and the barrel member 29 can be attached to the spool core 2 in the same direction, it is easy to automatically assemble the spool 1.

Figure 3:
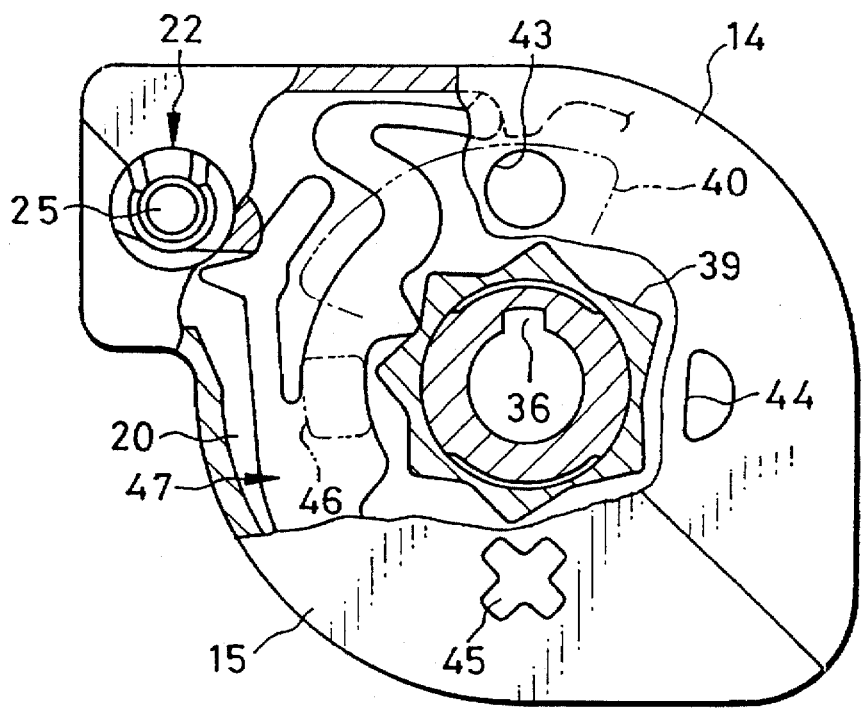
FIG. 3 is a right side view, partly broken away, of the film cassette of FIG. 1.

A slit 33 is also formed through the spool core 2 for securing a film trailer 12a to the spool core 2 through engaging holes 12b and 12c. As shown in FIGS. 2 and 3, key grooves 35 and 36 are formed in end faces of the spool core 2 for engagement with a drive shaft of the camera, to allow the drive shaft to rotate the spool core 2.

Figure 4:
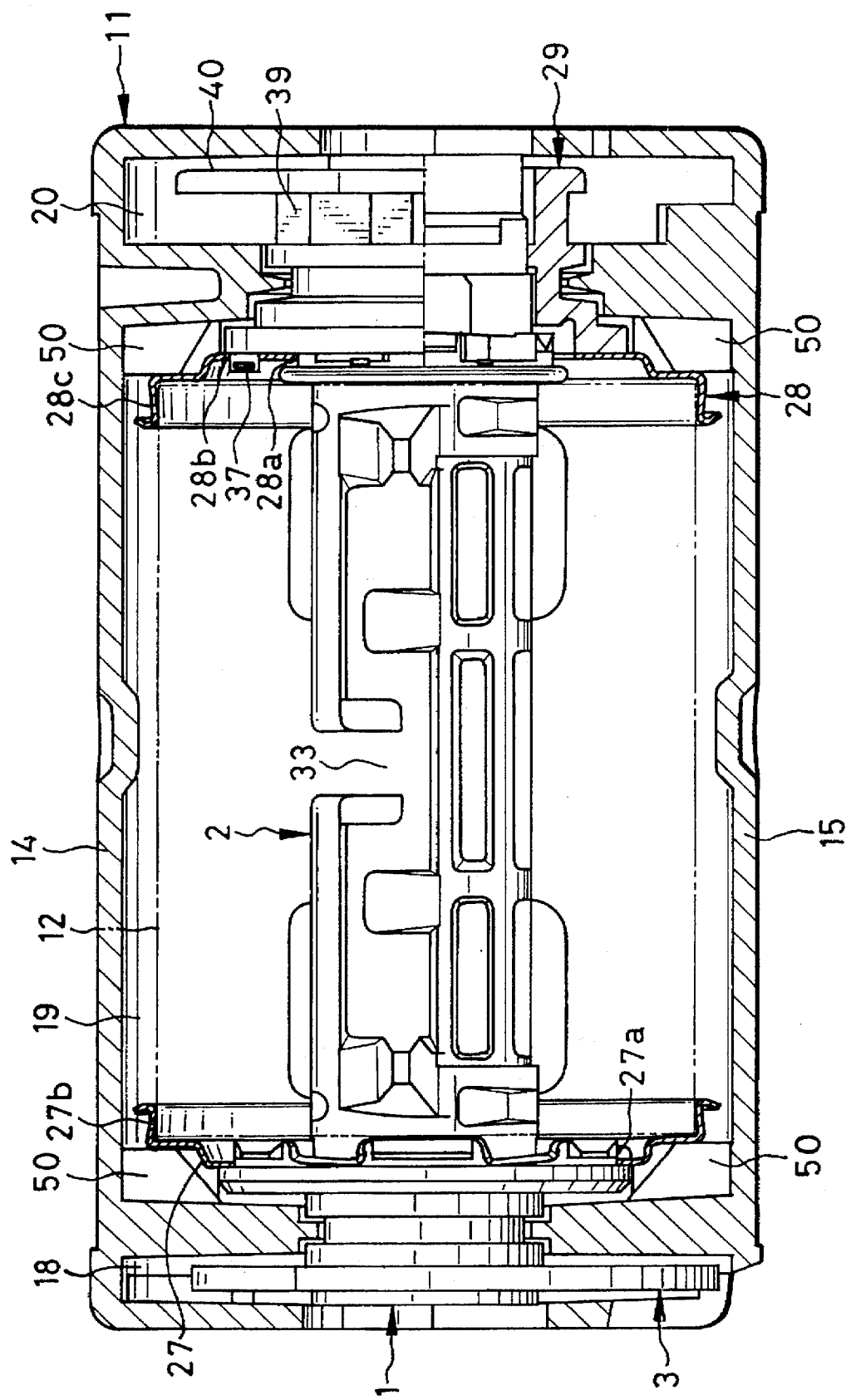
FIG. 4 is a sectional view of the film cassette of FIG. 1.

The barrel member 29 has a bearing ring 38 with two ratchet claws 37, a gear 39 and an indication flag 40 formed integrally into a part. The barrel member 29 rotates integrally with the spool core 2. In the assembled film cassette 10, the flanges 27 and 28 are located in the film roll chamber 19 with the filmstrip 12, and the data disc 3 is located in the data disc chamber 18, whereas the gear 39 and the indication flag 40 are located in the indicator chamber 20, as shown in FIG. 4.

Since the filmstrip 12 is entirely contained in the cassette shell 11 before as well as after the exposure, it is hard to discriminate from appearance between unused and used ones.

To allow the user to visually know in what stage the film cassette 10 presents, windows 43, 44, 45 and 46 are formed through the opposite side of the film cassette 10 from the opening 8. The window 43 is designated to effect an indication that the filmstrip 12 is unexposed. The window 44 is designated to effect an indication that the filmstrip 12 is partly exposed. The window 45 is designated to effect an indication that the filmstrip 12 is fully exposed. The window 46 is designated to effect an indication that the filmstrip 12 has been processed to develop the image. For the respective indication, the spool 1 is rotated to position the indication flag 40 behind one of the windows 43 to 46.

A spool lock 47 is mounted in the indicator chamber 20 of the cassette shell 11. As shown in FIG. 3, the spool lock 47 is able to mesh with the gear 39 when the door 22 is in the closed position, to lock the spool core 2 in a stationary state and thus prevent the filmstrip 12 from advancing. When the door 22 is opened, the spool lock 47 is disengaged from the gear 39.

The flanges 27 and 28 are formed from a plastic material to be thin and elastic. The flanges 27 and 28 have circumferential lips 27b and 28c, which protrude toward each other to cover the outermost convolution of the roll of the filmstrip 12 when the flanges 27 and 28 are mounted on the spool core 2. This construction prevents the film roll from loosening, and permits transmitting rotational movement of the spool core 2 to the outermost convolution of the film roll.

The flange 28 has four sector slots 28b formed at equal intervals around the bearing hole 28a. The ratchet claws 37 of the barrel member 29 are inserted in the slots 28b such that, while the spool core 2 rotates in a winding direction, the ratchet claws 37 slide over ends of the slots 28b to let the spool core 2 rotate separately from the flanges 27 and 28. Accordingly, the filmstrip 12 being wound is slid along the lips 27b and 28c of the flanges 27 and 28 while being confined in its lateral direction by the flanges 27 and 28.

When the spool core 2 rotates in a film advancing direction reverse to the winding direction, the ratchet claws 37 engage with the other ends of the slots 28b to rotate the flange 28 with the spool core 2. Then the roll of filmstrip 12 is rotated together with the spool core 2. As a result, a film leader is separated by the separation claw 23 from the roll. Further rotation of the spool 1 in the film advancing direction makes the film leader push aside the elastic flanges 27 and 28 to release the filmstrip 12 from confinement of the lips 27b and 28c. Thus, the filmstrip 12 is allowed to be advanced through the passage slot 21 to the outside of the cassette shell 11. The film roll chamber 19 has flange regulating ridges 50 (see FIG. 1) for preventing the flanges 27 and 28 from being bent away from each other in other portions than the proximity of the passage slot 21.

To prevent a used film cassette 10 from being loaded again in the camera, an anti-reuse opening 56 is formed through the other, i.e. lower shell half 15 in the same side as the opening 8. The anti-reuse opening 56 is able to accept a lever of the camera, which is mounted in a cassette chamber of the camera.

When the film cassette 10 is unused, the large radius portion 3a of the data disc 3 is exposed through the anti-reuse opening 56. After the film cassette 10 is loaded and exposed in the camera, the drive shafts of the camera rotates the spool 1 to remove the large radius portion 3a out of the opening 56, as is shown in FIG. 2. Therefore, the camera can distinguish used film cassettes 10 from unused ones with reference to the rotational position of the lever of the camera.

A film speed indication notch 57 may be formed in the same side as the openings 8 and 56, for enabling such cheap cameras that have no bar code sensor to determine the film speed of the loaded film cassette 10 without reading the bar codes 5. That is, the film speed indication notch 57 is formed in the film cassette 10 only when the contained filmstrip 12 is of ISO-400 or more.

The upper and lower shell halves 14 and 15, the spool core 2 and the door 22 are each formed by injection molding using a high impact polystyrene resin (Denka Styrole HI-R-Q: Denki Kagaku Kogyo K.K.) mixed with 1.0 wt % carbon black (Mitsubishi Carbon Black #950: Mitsubishi Chemical Industries, Ltd.) as light screen, and 1.5 wt % silicon oil (Shin-etsu Silicon KF96H—30,000 cs in viscosity: Shin-etsu Chemical Industries Co.) as lubricant. The barrel member 29 is formed by injection molding using the above mentioned high impact polystyrene resin mixed with the above mentioned carbon black of 0.01 wt % and titanium oxide (CR60-2: Ishihara Sangyo Kaisha, Ltd.) of 3.5 wt %.

The flanges 27 and 28 are each formed by vacuum and air-pressure forming from a 150 μm film of polymer alloy composed of polystyrene resin and polyphenylene ether resin (Zylon X9101: Asahi Kasei).

Alternatively, the flanges 27 and 28 may be formed from resin in accordance with injection molding to have an outer diameter of 15 mm mere, thickness of 0.3 mm or less, and a maximum projected area of 100 mm$^2$ or more as measured with a contour thereof, kept substantially circular. The resin is preferably selected from among nylon-modified polyphenyl ether which is constituted of polyphenyl ether (PPE) blended with nylon, polyolefin-modified PPE which is constituted of PPE blended with polyolefin (PO), polystyrene-modified PPE, such as Noryl and Zylon, which is constituted of PPE blended with polystyrene (PS), polycarbonate, nylon, modified nylon, and polyacetal. Also preferable are alloy of polyphenylene sulfide (PPS) and PPE, alloy of PPS and polybutylene terephthalate (PBT), alloy of PPE and LCP (liquid crystal plastic resin), and PPS mixed with 5–30 wt % GF (glass fiber or glass bead). If necessary, the resin may be loaded with antioxidant agents, light screen agents, antistatic agents and lubricant.

As the injection molding for the flanges 27 and 28, injection/compression molding may be applicable as ordinary injection molding. According to the injection/compression molding, the resin is injected into a set of molds, and is compressed within the molds with its gates sealed. As the flanges 27 and 28 have the center holes 27a and 28a, it is possible to adapt an in-mold de-gating method wherein a gate of the molds is positioned to correspond to the center hole 27a or 28a of the flange 27 or 28, and a center portion is cut off in the molds before the completion of molding, to form the center hole 27a or 28a. Instead of the in-mold de-gating method, the flanges may be formed by punching the center portion off the molded product after cooling.

Figure 5:
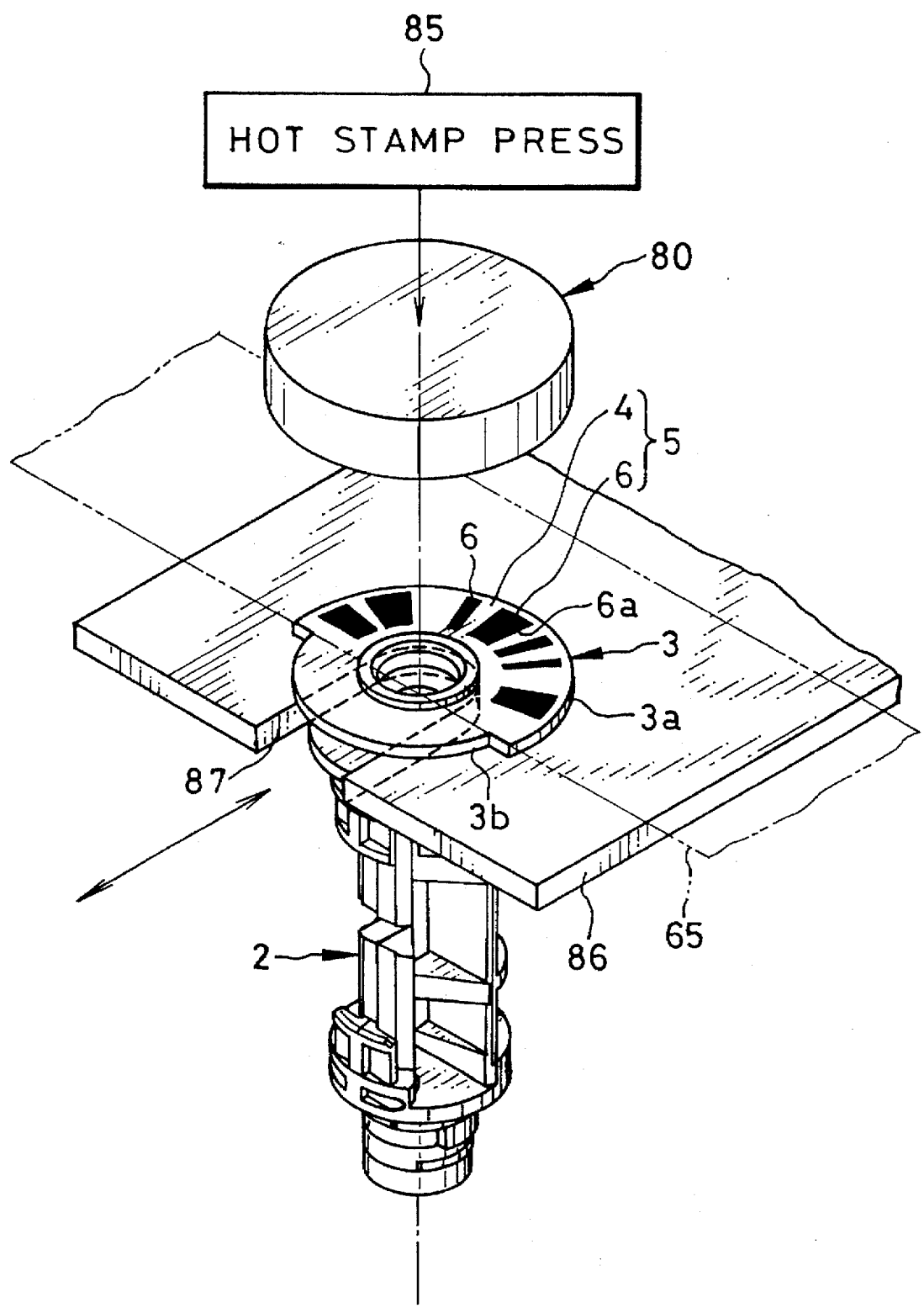
FIG. 5 is an explanatory view of a hot stamping apparatus embodying a transfer printing step of the film cassette production method of the invention.

FIG. 5 shows a bar code hot stamping apparatus embodying the transfer-printing step of the high level segments of the present invention. Like a conventional optical bar code, the bar code 5 on the data disc 3 consists of two kinds of alternating segments having different reflectivity from each other, of which one kind segments 4 represent binary "0" or a low level of the binary code, and the other kind segments 6 represent binary "1" or a high level of the binary code, or vise versa. As described above, the outer surface 4 of the data disc 3 having a low reflectance serves as the low level segments, and the high level segments 6 are provided by transfer printing a high reflective material from a transfer foil 65 onto the outer surface 4. In this embodiment, a hot stamping foil 65 is used as the transfer foil. The segments 4 and 6 are arranged radially, and each segment is of a sector-shape having different angular width according to the bit pattern of the binary code.

Since the data disc 3 of the spool 1 is usually formed by injection molding, the reflectance of the outer surface 4 depends on face roughness of metal molds. That is, the greater the face roughness of the mold becomes, the greater the surface roughness of the product becomes, and the less the reflectance of the outer surface 4 becomes. However, because the reflectance of a material or film transferred onto a surface is affected by the roughness of that surface, the outer surface 4 must not be so rough that the reflectance of the high level segments 6 is reduced too much to distinguish the high level segments 6 exactly from the low level of the binary code.

In view of the foregoing, according to an embodiment of the present invention, surface roughness Rmax of the outer surface 4 of the data disc 3 is defined to be 0.1 µm or more so as to keep its reflectance 8% or less. On the other hand, the present embodiment defines the surface roughness Rmax to be 20.0 µm or less. This is because, over this maximum limit of surface roughness of the outer surface 4, the high level segments 6 cannot maintain the necessary reflectance, and become likely to peel off the data disc 3 under high temperature and high humidity circumstances. Within this maximum limit of surface roughness of the outer surface 4, the reflectance of the high level segments 6 would not be less than 64% if the high reflective material of the foil 65 originally has a reflectance of 70% or more. Moreover, the high level segments 6 would not peel off even under high temperature and high humidity circumstances.

It is to be noted that the above mentioned surface roughness Rmax is a measure according to JIS K7104, a provision of "Method of Comparing Surface Roughness of plastics", and the reflectance is 60-degree specular gloss measured in accordance with JIS K7105, a provision of "Method of Testing Optical properties of Plastics".

Figure 6:
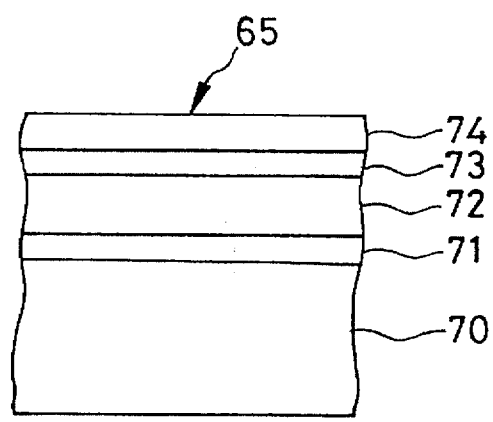
FIG. 6 is a sectional view of a hot stamping foil for use in the hot stamping apparatus shown in FIG. 5.

FIG. 6 shows an example of layered structure of the hot stamping foil 65. The hot stamping foil 65 is constituted of a base film 70, a releaser layer 71, a protector layer 72, a deposited metal layer 73 and an adhesive layer 74 laminated in this order on the base film 70. In hot stamping or printing, the layers over the releaser layer are transferred to the data disc 3.

According to a preferred embodiment, the base film 70 is a polyester film of 12 µm thick, and the protector layer 72 with the deposited metal layer 73 of 400 Å thick aluminum is formed on one surface of the base film 70 via the releaser layer 71 of 300 Å thick. The reflectance of the aluminum deposit layer 73 is 88% prior to the transfer. The adhesive layer 74 for securing the transferred layers to the data disc 3 is formed on the aluminum deposit layer 73 by coating. The protector layer 72 consists of transparent polyester of 3 µm thick. The adhesive layer 74 consists of copolymer of acrylic ester and vinyl chloride, and has a thickness of 2 µm. As material of the releaser layer 71, silicone resin, surface active-agent, fatty acid, lubricant, or the like may be used.

For reliable discrimination between the high and low levels of the binary code, it is necessary for the bar code to make the edges of the respective segments as sharp as possible, especially for those segments which have smaller angular widths. If edges 6a of the high level segments 6 are unsharp, light would be irregularly reflected from those unsharp edges, so that the reflectance of the low level segments 4 would increase, to making it difficult to discriminate between the high level and the low level of the decoded binary signal. Therefore the high level segments 6 must be sharply cut from the hot stamping foil 65.

Figure 7:
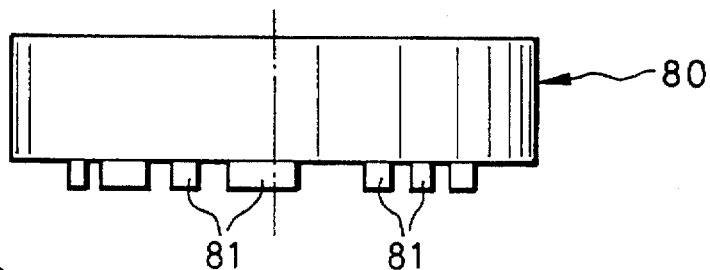
FIG. 7 is a side view of a hot stamping die of the hot stamping apparatus shown in FIG. 6.
Figure 8:
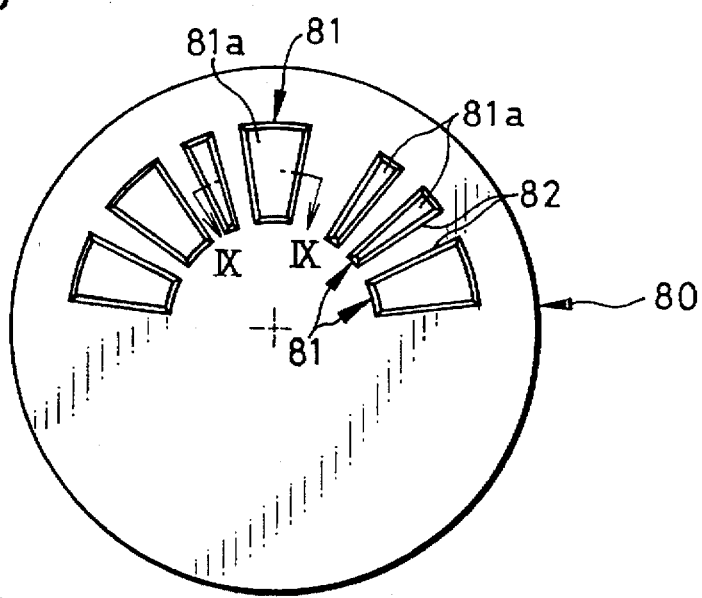
FIG. 8 is a face side view of the hot stamping die shown in FIG. 7.
Figure 9:
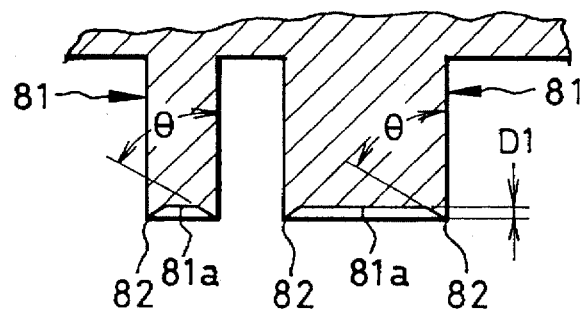
FIG. 9 is an enlarged sectional view of the hot stamping die taken along a line IX—IX of FIG. 8.

In an embodiment of the invention as shown in FIGS. 7 and 8, a hot stamping die 80 is made of brass. The hot stamping die is a relief-engraving die having a face pattern in form of sector protrusions 81 with flat top surface 81a. The face pattern corresponds to the pattern of the bar code 5. That is, the sector protrusions 81 are formed in correspondence with the high level segments 6 of the bar code 5. And, as shown in detail in FIG. 9, edges 82 of the sector protrusions 81 for cutting the high level segments 6 off the hot stamping foil 65 are shaped to be acute. According to a preferred embodiment, the acute angle θ of the cutting edges 82 is 75°. In this way, the sharpness of edges 6a of the high level segments 6 is ensured even after a large number of hot stamping.

The hot stamping die 80 is pressed onto the data disc 3 through a hot stamping press 85. A spool holder 86 is disposed on opposite side of the hot stamping die 80 from the hot stamping press 85. The spool holder 86 has a slot or opening 87 for accepting the spool core 2 in a radial direction of the spool core 2 to support the data disc 3 on opposite sides of the spool core 2. The slot 87 is so designed that the data disc 3 is fixed coaxial with the hot stamping die 80 at the end position of the slot 87, and the large radius portion 3a of the data disc 3 is entirely supported on the spool holder 86.

In this way, the data disc 3 is exactly positioned relative to the die 80 with ease, and distortion or deformation of the data disc 3 is minimized even if the data disc 3 is loaded with a stamping pressure of approximately 1 ton. As a result, the data disc 3, especially the large radius portion 3a, is maintained flat sufficiently for reliable hot stamping, that is, 200 µm or less in flatness, wherein the flatness is measured according to JIS B0621, a norm of "Flatness". Because the spool core 2 is positioned stationary, and the hot stamping foil 65 is fed in form of a web, the data disc 3 can be positioned exactly relative to the hot stamping foil 65.

Because the hot stamping die 80 can be located in proximity to an assembly line of the film cassette 10, it becomes possible to provide the bar code 5 in a station of the assembly line.

EXAMPLES

The table of FIG. 10 shows results of an experiment on accuracy or reliability in reading of bar codes 5 whose high level segments 6 were hot stamped by using various hot stamping dies which have the same construction as the above-described hot stamping die 80, but with cutting edges 82 differently angled. In hot stamping, the above-described hot stamping foil 65 having the aluminum deposit layer 73 with original reflectance of 88% was used. As the hot stamping press 85, Hot Stamping Machine Model V-08 (produced by Nabitas Co.) was used. The hot stamping die was heated up to 150°, and the transfer printing time was 0.5 seconds. The surface roughness Rmax of the outer surface 4 of the data disc 3 was 2 μm, and the flatness of the data disc 3 was 25 μm.

In Table of FIG. 10, "A", "B", "C" and "D" represent evaluation grades, wherein "A" means that the result was satisfactory, i.e., consequent bar codes can be read with accuracy. "B" means that the result was quite sufficient. "C" means that the result was on the border line but the bar codes were practically useful. "D" means that the result was so bad that the bar codes were useless.

As shown in Table of FIG. 10, Comparative Example 1 with the edge angle θ of 92° was not able to cut the edges 6a of the high level segments 6 sharply enough to prevent the irregular reflection. Also, comparative example 2 with the edge angle θ of 58° were quickly so that the cutting sharpness was deteriorated sooner. Reading errors occurred so frequently the Comparative Examples were useless in practice. With the edge angle θ being 60° to 90°, as Embodiments 1 to 6, the edges 6a of the high level segments 6 were cut sharp enough so that the irregular reflection was reduced down to a practically negligible extent.

According to the results of the experiments, the edge angle θ should be 60° to 90°, preferably from 65° to 85°, and more preferably from 70° to 80°. In this range of the edge angle θ, it is possible to cut the edges 6a of the high level segments 6 sufficiently sharp enough to reduce the irregular reflection at the edges 6a.

The table of FIG. 11 shows results of an experiment on reflectance and adhesive strength of the bar codes 5 hot stamped on data discs 3 having a different surface roughness. For this experiment, the hot stamping foil 65 having the above-described construction but having the aluminum deposit layer 73 with original reflectance of 70% was used. As the hot stamping press 85, Hot Stamping Machine Model V-08 was used. In this experiment, the flatness of the data discs 3 were 25 μm, and the edge angle θ of the hot stamping die 80 was 75°.

Table of FIG. 11 shows that the reflectance of the low level segments 4 was so high in Comparative Example 3 whose surface roughness Rmax of the data disc 3 was 0.08 μm, that it was hard for an automatic bar code reader to distinguish the low level segments 4 from the high level segments 6. In Embodiments 7 to 13 and Comparative Example 4, where the data discs 3 had greater surface roughness, the reflectance of the outer surface 4 was low enough for use as the low level segments. However, the reflectance of the transferred high level segments was reduced with increase of the roughness of the transferred surface. When the surface roughness was 22 μm as in Comparative Example 4, the reflectance of the high level segments 6 was too reduced to distinguish them from the low level segments 4 by the bar code reader. It was proved that, for accurate decoding of the bar code, the reflectance of the outer surface 4 of the data disc, i.e., the reflectance of the low level segments 4 is expected to be 8% or less, while the reflectance of the high level segments is expected to be 64% or more.

Also the adhesive strength of the high level segments 6 was reduced with the increase of the surface roughness. When the surface roughness was 22 μm as in Comparative Example 4, the adhesive strength of the high level segments 6 was so reduced that they were apt to peel off in hot and high humidity circumstances.

Consequently, the surface roughness Rmax of the outer surface 4 of the data disc 3 is preferably from 0.1 μm to 20 μm, more preferably from 0.2 μm to 15 μm, and most preferably from 0.3 μm to 10 μm.

It is to be noted that the flatness of the data disc 3 should be 200 μm or less, preferably 150 μm or less, more preferably 100 μm or less, and most preferably 50 μm or less.

In bar codes, the reflectance of the high level segments should be five or more times that of the low level segments, preferably six or more times, and more preferably eight or more times that of the low level segments.

The layered construction of the hot stamping foil 65 should not necessarily be limited to the above-described embodiment. For example, the base film 70 may be a polyester film of 12 μm to 30 μm thick, and the protector layer 72 with the deposited metal layer 73 of 300 Å to 1200 Å thick may be formed on one surface of the base film 70 via the releaser layer 71 of 100 Å to 1500 Å thick. The deposited metal of the layer 73 may be aluminum, chromium, or another metal or alloy. Instead of metal deposition, a metal layer may be formed by plating chromium or the like. The protector layer 72 may be formed by coating a transparent resin, which may contain a transparent coloring agent, in an appropriate thickness of 1–5 μm. The adhesive layer 74 may be copolymer of acrylic ester and vinyl chloride, polyvinyl butyral, polyamide, copolymer of vinyl acetate and vinyl chloride, or the like. Preferable thickness of the adhesive layer is 0.5–5 μm.

The deposited metal layer 73 may be replaced by a paint or ink layer. The paint or the ink may be white or another color. The high reflective material of the high level segments 6 may be any other material that could provide the high level segments with a high reflectance that is five or more times higher than that of the low level segments.

As the high level segments 6 of the bar code 5 are required to be sharp only in the edges between the high level segments and the low level segments, that is, in the edges extending in radial directions of the data disc 3, and the sharpness of the edges in the circumferential directions has little effect on the accuracy of bar code reading, the angle θ of the cutting edges 82 of the sector protrusions 81 of the hot stamping die 80 may be 90° in the circumferential directions, or may be larger than that of the radial cutting edges 82, but not more than 90°. The hot stamping die 80 may be made of tool steel, dies steel, or the like, though the brass die is more preferable in terms of durability. Regardless of the durability, the die 80 may be made of silicone rubber, urethane rubber or another elastic material.

The present invention is applicable to those data disc which are formed separately from the spool core, through the above embodiment has the integrally formed data disc 3. In that case, the hot stamping of the bar code may be performed either before or after attaching the data disc to the spool core.

Figure 12:
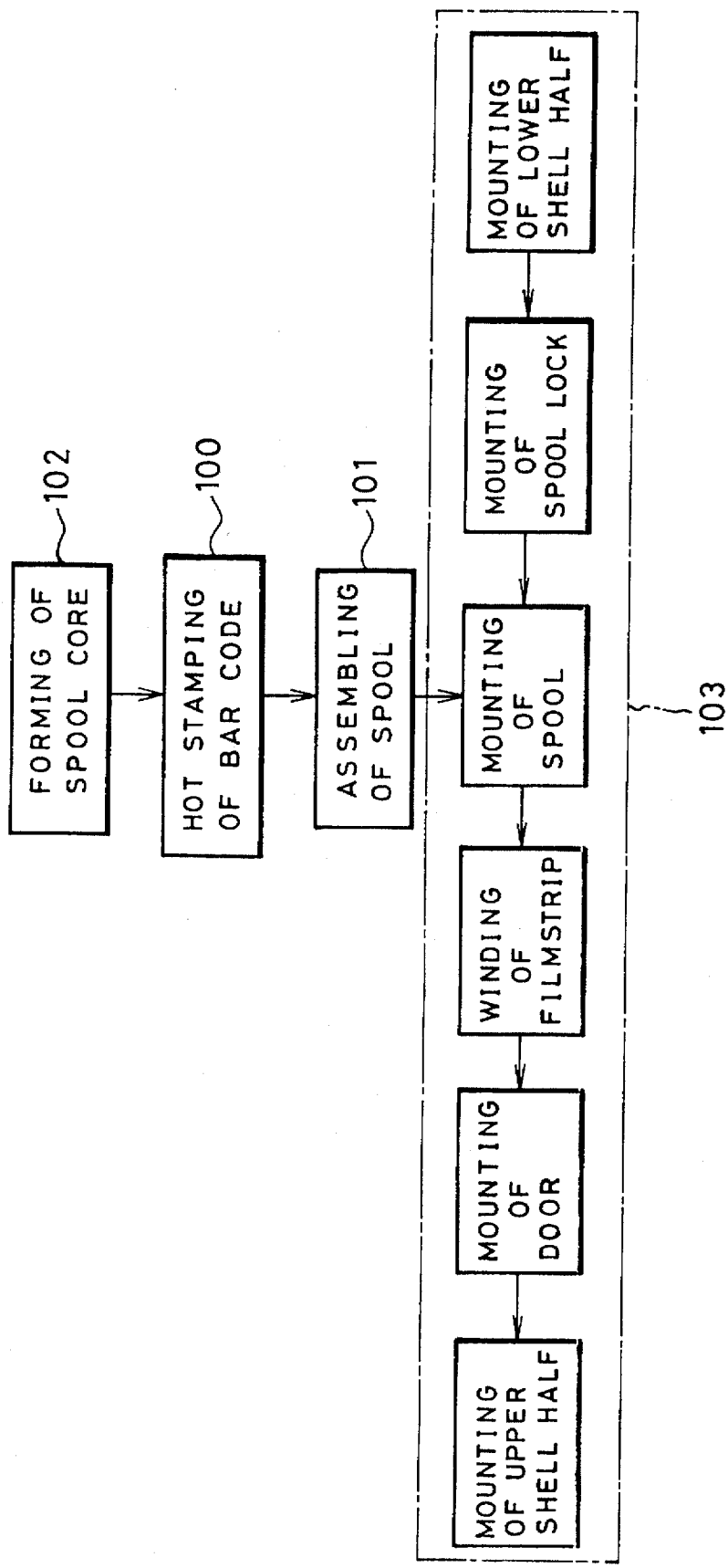
FIG. 12 is an explanatory view of an example of film cassette manufacturing line embodying the method of present invention.

FIG. 12 shows an example of manufacturing process of the film cassette 10. A hot stamping step 100 for the bar code 5 is performed prior to a spool assembling step 101, by use of the hot stamping apparatus as shown in FIG. 5. The spool core 2 is formed by injection molding in a spool core forming step 102 prior to the hot stamping step 100. In the spool assembling step 101, the flanges 27 and 28 are fitted on the spool core 2, and then the barrel member 29 is fitted on the spool core 2, to constitute the spool 1.

In a cassette assembling process 103, specific pallets (not shown) are successively fed to stop at a series of assembling stations by use of an indexing machine. In the first station, the lower shell half 15 is mounted on the pallet. In the second station, the spool lock 47 is mounted in the lower shell half 15. In the third station, the assembled spool 1 is mounted in the lower shell half 15. In the fourth station, the filmstrip 12 is wound on the spool 1. In the next station, the door 22 is mounted in the lower shell half 15. And the upper shell half 14 is mated with the lower shell half 15 in the last station.

In this way, the bar code 5 is provided in the manufacturing line of the film cassette 10, in correspondence with the type of the photographic filmstrip 12 to be wound on the spool 1. Therefore, it is possible to avoid mismatching the bar code 5 with the filmstrip 12, without the need for a complicated process for storing spools with various bar codes according to the kinds of bar codes and correlating the bar codes with the film types prior to the film winding.

It is possible to assemble the spool 1 in the same line as other parts of the film cassette 10. For this purpose, a spool supporting hole is additionally formed on the pallet to support one end of the spool core 2 to fix it in a vertical posture. Then, the flanges 27 and 28 and the barrel member 29 are sequentially fitted from the other upper end of the spool core 2. In this case, the high level segments 6 of the bar code 5 may be hot stamped onto the data disc 3 immediately before the spool core 2 is mounted on the pallet.

Thus, the present invention should not be considered limited to the above-described embodiment but, on the contrary, various modifications may be possible for person skilled in the art without departing from the scope of the appended claims.

What is claimed is:

1. A photographic film cassette comprising:

a spool with a roll of filmstrip wound thereon;

a disc secured to or formed integrally with the spool; and a bar code disposed on an outer surface of the disc, the bar code being constituted of a pattern of alternating low level segments and high level segments arranged in correspondence with a bit pattern of binary data;

wherein the high level segments are formed by a high reflective metallic material transferred onto the outer surface of the disc, such that the boundaries between the high level segments and low level segments are distinct.

2. The photographic film cassette according to claim 1, wherein the outer surface of the disc has a surface roughness of 0.1 μm to 20 μm.

3. The photographic film cassette according to claim 2, wherein the disc is colored black.

4. A photographic film cassette according to claim 1, wherein the low level segments are formed by the outer surface of the disc.

5. The photographic film cassette according to claim 1, wherein the high level segments are formed by a deposited metal layer.

6. The photographic film cassette according to claim 1, wherein the high level segments comprise a protector layer, a deposited metal layer and an adhesive layer which are transferred from a foil by means of hot stamping, the foil being constituted of a base film, a releaser layer, a protector layer, a deposited metal layer and an adhesive layer laminated in this order on the base film, and the hot stamping being carried out in the state that the adhesive layer of the foil contacts the outer surface of the disc.

7. The photographic film cassette according to claim 1, wherein the disc has a flatness of 200 μm or less.

8. A method of producing a photographic film cassette having a spool with a roll of filmstrip wound thereon, a data disc secured to or formed integrally with the spool and a bar code disposed on an outer surface of data disc, the bar code being constituted of a pattern of alternating low level segments and high level segments arranged in correspondence with a bit pattern of binary data representative of information about the filmstrip, the method by comprising the steps of:

forming the data disc to have a surface roughness of 0.1 μm to 20 μm, and a flatness of 200 μm or less; and transfer-printing the high level segments onto the outer surface of the disc.

9. The method according to claim 8, wherein a transfer foil having a layer of high reflective material is used in the transfer-printing step, and a transfer die having a face pattern corresponding to the high level segments of the bar code is used for transferring the high reflective material from the transfer foil onto the outer surface of the data disc to form the high level segments.

10. The method according to claim 9, wherein the transfer die is a relief-engraved hot stamping die where the face pattern is formed as protrusions, and edges of the protrusions have an angle of 60° to 90°.

11. The method according to claim 8, wherein the transfer-printing step is performed immediately before the filmstrip is wound on the spool or before the spool is assembled.

12. The method according to claim 8, wherein the high level segments are formed by a deposited metal layer.

13. The method according to claim 8, wherein a foil is used in the transfer printing step, the foil being constituted of a base film, a releaser layer, a protector layer, a deposited metal layer and an adhesive layer laminated in this order on the base film, the transfer-printing step comprising the steps of:

contacting the adhesive layer of the foil with the outer surface of the disc; and heating the foil from the base film side thereof in order to transfer the high level segments including the protector layer, the deposited metal layer and the adhesive layer.

14. The method according to claim 8, wherein the high level segment has a reflectance of 70% or more.

15. A photographic film cassette comprising:

a spool with a roll of filmstrip wound thereon;

a disc secured to or formed integrally with the spool; and a bar code disposed on an outer surface of the disc, the bar code being constituted of a pattern of alternating low level segments and high level segments arranged in correspondence with a bit pattern of binary data;

wherein the high level segments are formed by a high reflective metallic material having a reflectance of 70% or more and transferred onto the outer surface of the disc, such that the boundaries between the high level segments and low level segments are distinct.

16. The photographic film cassette according to claim 15, wherein the outer surface of the disc has a surface roughness of 0.1 μm to 20 μm.

17. The photographic film cassette according to claim 15, wherein the high level segments are formed by a deposited metal layer.

18. The photographic film cassette according to claim 15, wherein the high level segments comprise a protector layer, a deposited metal layer and an adhesive layer which are transferred from a foil by means of hot stamping, the foil being constituted of a base film, a releaser layer, a protector layer, a deposited metal layer and an adhesive layer laminated in this order on the base film, and the hot stamping being carried out in the state that the adhesive layer of the foil contacts the outer surface of the disc.

19. A photographic film cassette according to claim 15, wherein the low level segments are formed by the outer surface of the disc.

* * * * *